(No Model.)
T. A. EDISON.
SYSTEM OF ELECTRICAL DISTRIBUTION.
No. 524,378.  Patented Aug. 14, 1894.
Fig. 1.
Fig. 2.
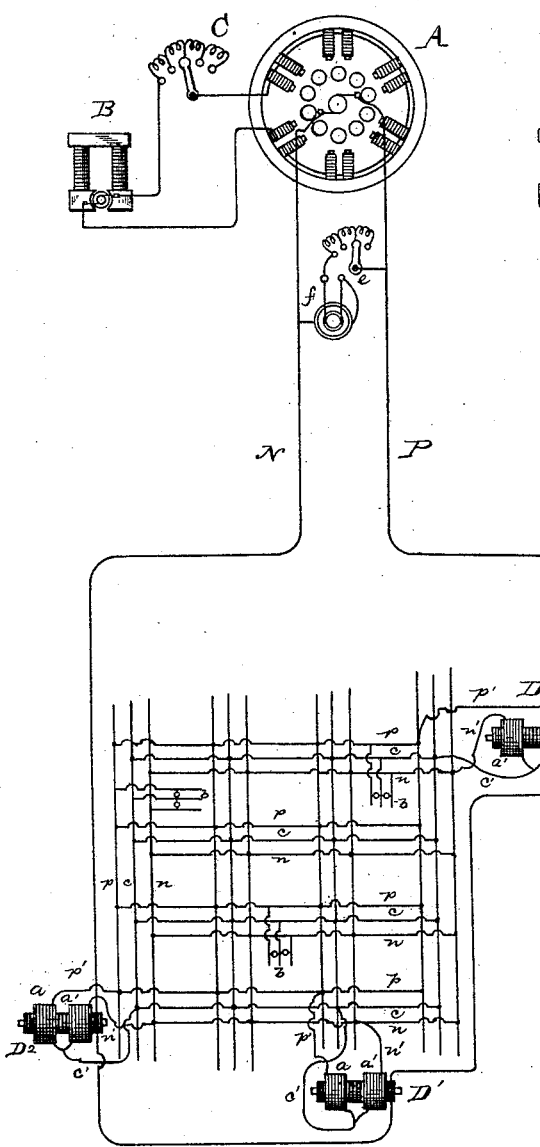
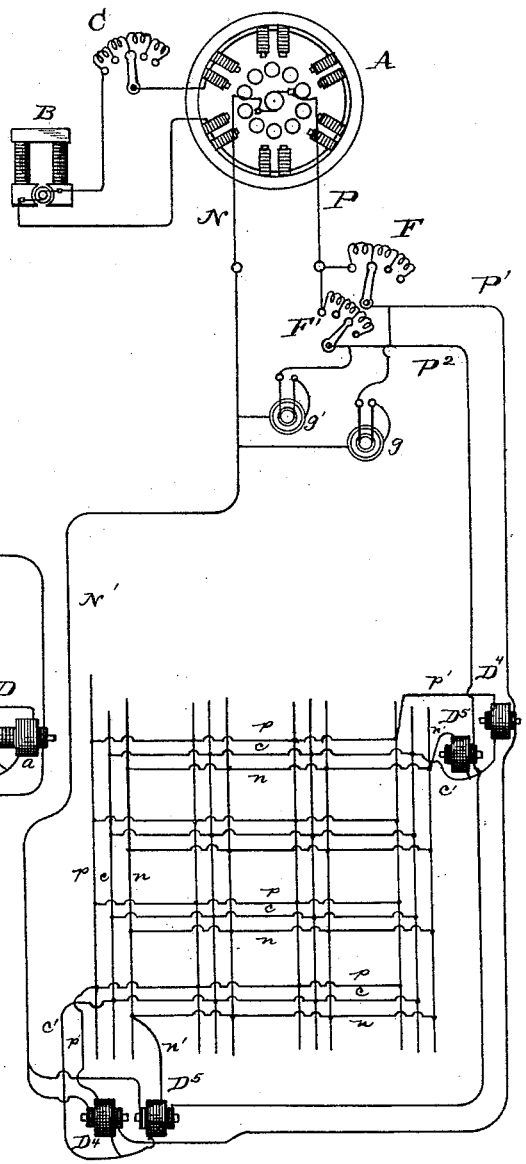
ATTEST:
INVENTOR:

UNITED STATES PATENT OFFICE.

THOMAS A. EDISON, OF LLEWELLYN PARK, NEW JERSEY.

SYSTEM OF ELECTRICAL DISTRIBUTION.

SPECIFICATION forming part of Letters Patent No. 524,378, dated August 14, 1894.

Application filed December 6, 1886. Serial No. 220,793. (No model.)

*To all whom it may concern:*

Be it known that I, THOMAS A. EDISON, of Llewellyn Park, in the county of Essex and State of New Jersey, have invented a certain new and useful Improvement in Systems of Electrical Distribution, (Case No. 692,) of which the following is a specification.

My invention relates to three wire or compensating systems of electrical distribution in which the lamps or other translating devices are arranged in multiple series, and a third wire or compensating conductor for preserving the balance of the system extends from the translation circuits to the source of supply.

My object is to provide a system in which the greatest economy in the amount of metal required for conductors will be attained, by combining the advantages in this respect of the three wire system with those arising from the use of currents of high tension reduced at the places supplied, by induction coils or converters, to that required for the translating devices.

Heretofore the economy derived from the use of high tension current and converters has been to a great extent negatived by the employment of a two wire system for the translation circuits.

My invention is illustrated in the accompanying drawings, in which—

Figure 1, is a diagram of a system embodying said invention in which double wound converters are employed; and Fig. 2, a similar diagram illustrating the employment of separate converters.

A represents an alternating current dynamo electric machine of which one or more may be used to form a source of current of very high tension.

B is a continuous current generator for energizing the field magnets of the alternating machine or machines. In this field circuit is an adjustable resistance C for regulating the electro-motive force of the source of supply A.

From the generator A a circuit P N extends to divided induction devices or converters for reducing the tension of the current. In the arrangement shown in Fig. 1, this circuit includes the primary coils of induction coils or converters D, D' and D², all of which are in series in said circuit. From these converters which reduce the tension of the current, current of the proper tension for lighting or other domestic or business purposes is supplied to the system of intersecting positive, negative and compensating mains or lighting conductors $p$, $n$, $c$, which extend along the streets of the district supplied and are connected together, like to like, at the street intersections where the conductors meet.

The divided converters have each two secondary coils $a$ and $a'$. From one secondary circuit of a converter, a conductor $p'$ extends to the positive side $p$ of the connected system; from the other secondary circuit a conductor $n'$ extends to the negative side $n$; and the two secondary coils are joined together, and from their junction a conductor $c'$ extends to the compensating main conductor $c$. The electric lamps or other translating devices $b$ $b$ are connected as shown in multiple series each translating device being connected between one of the outer conductors and the compensating conductor as is well understood. By this arrangement the induction coil or converter becomes a divided source of electricity connected with translating devices in multiple series and having a compensating conductor connecting the translation circuits with the point of division of the source. It will be readily seen that this permits the use of currents of double the tension of those used in a two-wire multiple arc system, the compensating conductor preserving the balance of the system; and there is consequently a great saving in the metal required for conductors leading from the converters to the mains or lighting conductors, and also for the mains themselves and since the conductors P N convey only the current of very high tension generated at the source and therefore are of very small wire, there results in my system a greater degree of economy in this respect than has hitherto been attained.

A suitable indicator $e$, is preferably placed across the conductors P N at the station where the generator is situated, indicating the difference of potential between said conductors; and in accordance with these indications the electro-motive force at the source is regulated by adjusting the resistance C; or if there are several generators A in series, one or more of them may be cut in or out of circuit as a means of regulation. The indicator $e$ is preferably of such character as is set forth in my application, Serial No. 220,792 of even date herewith— that is one in which the two coils $f$ $f'$ are in the same circuit and the indications are therefore not affected by the change in polarity of the alternating current. It is however sometimes desirable in the compensating or three-wire system to have the two sides of the system independently regulable, whereby the balance may be maintained if the system becomes unbalanced by reason of changes in the relative number of translating devices connected on the two sides thereof. An arrangement whereby this may be accomplished is shown in Fig. 2.

The conductors P N from the generator A extend to suitable terminal points within the station, whence, from the conductor P conductors P' P² extend and from conductor N, a conductor N' extends.

For each of the double induction coils of Fig. 1, there is substituted in this system two induction coils $D^4$ and $D^5$ each pair of which forms a divided induction device or converter. Conductor P' includes the primary coils, in series, of the two induction coils $D^4$, $D^4$; and conductor P² similarly includes the primaries of $D^5$, $D^5$. The secondary coils of each pair are connected to the system of mains in the same manner as the two secondaries of the double induction coil in the other arrangement. That is, the secondary of coil $D^4$ is connected with the positive side $p$ of the system; the secondary of coil $D^5$ is connected with the negative side $n$; and the two secondaries are joined together and at the junction connected by $c^2$ with the middle conductor $c$. Divided sources of electricity are thus formed as before.

Conductors P' and P² both are connected with return conductor N'.

The two sides of the system are regulated independently to keep the system balanced by the adjustable resistances F F' situated respectively in the conductors P' and P² which being adjusted relatively to each other vary the current given to $D^4$ relatively to that of $D^5$, whereby the two sides of the lighting system are kept in balance. Such regulation is performed in accordance with the showings of the indicators $g$ $g'$ connected respectively between P' and N', and P² and N², which show the pressure on each side of the system at the centers of consumption where the converters are placed.

With the system shown in Fig. 2 other forms of induction apparatus than induction coil converters may be used.

I do not claim broadly in this application the combination of main conductors, tension reducing devices, and a three-wire consumption circuit or system connected to the secondary of said devices, that being included in my Patent No. 287,516, dated October 30, 1883.

What I claim is—

In a system of electrical distribution, the combination of a source of current of high tension, two feeding circuits extending therefrom, each including the primary coils of a tension reducing converter, a circuit including translating devices in multiple series, a conductor from the secondary of one converter extending to said translation circuit, a conductor from the secondary of the converter in the other feeding circuit, also extending to said translation circuit, a conductor extending from between the translating devices to one joining the two secondaries, and means for separately regulating the two feeding circuits, substantially as set forth.

This specification signed and witnessed this 9th day of November, 1886.

THOS. A. EDISON.

Witnesses:
WM. PELZER,
E. C. ROWLAND.